US011914991B1

(12) United States Patent
Warfield et al.

(10) Patent No.: US 11,914,991 B1
(45) Date of Patent: *Feb. 27, 2024

(54) MODULAR SOFTWARE APPLICATION CONFIGURATION MANAGEMENT

(71) Applicant: Liberty Mutual Insurance Company, Boston, MA (US)

(72) Inventors: Todd Warfield, Portsmouth, NH (US); Serkan Varlikli, Portsmouth, NH (US); Jason Markham, Portsmouth, NH (US)

(73) Assignee: Liberty Mutual Insurance Company, Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/930,248

(22) Filed: Sep. 7, 2022

Related U.S. Application Data

(63) Continuation of application No. 17/201,692, filed on Mar. 15, 2021, now Pat. No. 11,474,814.

(60) Provisional application No. 62/989,233, filed on Mar. 13, 2020.

(51) Int. Cl.
*G06F 8/71* (2018.01)
*G06F 11/36* (2006.01)

(52) U.S. Cl.
CPC ............ *G06F 8/71* (2013.01); *G06F 11/3688* (2013.01)

(58) Field of Classification Search
CPC ............................... G06F 8/71; G06F 11/3688
See application file for complete search history.

(56) References Cited

U.S. PATENT DOCUMENTS

| 7,376,719 B1* | 5/2008 | Shafer ................ H04L 41/0893 709/223 |
| 8,572,679 B1 | 10/2013 | Wang et al. |
| 8,997,088 B2* | 3/2015 | Gurikar ..................... G06F 8/60 717/169 |
| 9,454,351 B2 | 9/2016 | Anderson et al. |
| 9,477,454 B2 | 10/2016 | Scheiner et al. |
| 9,785,431 B2* | 10/2017 | Chen ........................ G06F 8/71 |
| 9,910,654 B1 | 3/2018 | Brigham, II et al. |

(Continued)

OTHER PUBLICATIONS

"Automated Release Notes For Jira," Amoeboids Technologies Pvt. Ltd., Atlassian Marketplace, (3 pages), [online], [Retrieved from the Internet Jun. 14, 2021] <https://marketplace.atlassian.com/apps/1215431/automated-release-notes-for-jira?hosting=cloud&tab=overview>.

(Continued)

*Primary Examiner* — Douglas M Slachta
(74) *Attorney, Agent, or Firm* — Alston & Bird LLP

(57) ABSTRACT

Methods, apparatuses, systems, computing entities, and/or the like are provided. An example method may include determining per-application configuration data associated with a software application; determining per-client configuration data associated with a client system; determining per-application per-client configuration data associated with the software application and the client system; generating modular configuration data based at least in part on at least one of the per-application configuration data, the per-client configuration data, and the per-application per-client configuration data; generating a releasable software application based at least in part on the modular configuration data; and performing one or more software release operations by transmitting the releasable software application to the client system.

20 Claims, 8 Drawing Sheets

(56) References Cited

U.S. PATENT DOCUMENTS

| | | | |
|---|---|---|---|
| 10,296,302 B1* | 5/2019 | Ma | G06F 11/3688 |
| 10,389,651 B2 | 8/2019 | Ferris et al. | |
| 10,409,562 B2 | 9/2019 | Leonelli et al. | |
| 10,503,496 B2* | 12/2019 | Natari | G06F 8/71 |
| 10,824,414 B2 | 11/2020 | Kuchibhotla et al. | |
| 10,877,735 B1 | 12/2020 | Buck et al. | |
| 10,884,767 B2 | 1/2021 | Zhou | |
| 10,929,378 B1 | 2/2021 | Bigman et al. | |
| 11,281,570 B2* | 3/2022 | Zhou | G06F 11/368 |
| 11,461,093 B1* | 10/2022 | Edminster | G06F 8/60 |
| 11,474,814 B1 | 10/2022 | Warfield et al. | |
| 2003/0005093 A1* | 1/2003 | Deboer | G06F 9/44505 709/220 |
| 2006/0190486 A1* | 8/2006 | Zhou | G06Q 10/06 |
| 2006/0277542 A1 | 12/2006 | Wipfel | |
| 2006/0291398 A1* | 12/2006 | Potter, IV | G06F 11/3684 370/252 |
| 2008/0104573 A1* | 5/2008 | Singla | G06F 8/71 717/120 |
| 2010/0131939 A1* | 5/2010 | Hieb | G06F 8/73 717/169 |
| 2012/0311471 A1 | 12/2012 | Bullard et al. | |
| 2014/0149966 A1* | 5/2014 | Binjrajka | G06F 8/72 717/121 |
| 2014/0298321 A1 | 10/2014 | Morino et al. | |
| 2014/0304690 A1* | 10/2014 | Wohlberg | G06F 8/71 717/136 |
| 2015/0067642 A1* | 3/2015 | Chen | G06F 8/71 717/121 |
| 2015/0301824 A1 | 10/2015 | Patton et al. | |
| 2016/0269227 A1 | 9/2016 | Alford et al. | |
| 2017/0039035 A1 | 2/2017 | Woodward | |
| 2017/0083290 A1 | 3/2017 | Bharthulwar | |
| 2018/0083840 A1 | 3/2018 | Poonen et al. | |
| 2018/0157466 A1 | 6/2018 | Jubran et al. | |
| 2018/0267779 A1* | 9/2018 | Leonelli | G06F 8/447 |
| 2018/0336027 A1* | 11/2018 | Narayanan | G06F 8/71 |
| 2019/0012183 A1 | 1/2019 | Saunders | |
| 2020/0409690 A1 | 12/2020 | Rouland et al. | |
| 2021/0049002 A1 | 2/2021 | Myers et al. | |
| 2021/0096826 A1 | 4/2021 | Duggal et al. | |
| 2022/0164452 A1* | 5/2022 | Landman | H04L 9/0618 |

OTHER PUBLICATIONS

"Automating Infrastructure Deployments In The Cloud With Terraform and Azure Pipelines," Azure DevOps Labs, May 31, 2021, (17 pages), (online), [Retrieved from the Internet Jun. 14, 2021] <https://azuredevopslabs.com/labs/vstsextend/terraform/>.

"Continuous Delivery Pipeline 101," Atlassian CI/CD, (11 pages), (article, online), [Retrieved from the Internet Jun. 14, 2021] <https://www.atlassian.com/continuous-delivery/pipeline>.

"Continuous Delivery Pipelines: Metrics, Myths, and Milestones," Slideshare, Jan. 24, 2018, (23 pages), (online), [Retrieved from the Internet Jun. 14, 2021] <https://www.slideshare.net/DevOpsWebinars/continuous-delivery-pipelines-metrics-myths-and-milestones>.

"Release Pipelines," Azure Pipelines, Microsoft, Dec. 16, 2020, (14 pages), (online), [Retrieved from the Internet Jun. 14, 2021] <https://docs.microsoft.com/en-us/azure/devops/pipelines/release/?view=azure-devops>.

"Run Automated Tests From Test Plans," Microsoft, Azure DevOps, Sep. 30, 2019 (19 pages), (online), [Retrieved from the Internet Jun. 14, 2021] <https://docs.microsoft.com/en-us/azure/devops/test/run-automated-tests-from-test-hub?view=azure-devops>.

"Use Pipelines As Code In Armory Enterprise," Armory Docs, (29 pages), (article, online), [Retrieved from the Internet Jun. 14, 2021] <https://docs.armory.io/docs/spinnaker-user-guides/using-dinghy/>.

Fennell, Richard (Black Marble). "Generate Release Notes (Crossplatform)," Visual Studio Marketplace, (9 pages), Apr. 12, 2017, (article, online), [Retrieved from the Internet Jun. 14, 2021] <https://marketplace.visualstudio.com/items?itemName=richardfennellBM.BM-VSTS-XplatGenerateReleaseNotes>.

Final Office Action for U.S. Appl. No. 17/201,696, dated May 3, 2022, (28 pages, United States Patent and Trademark Office, US.

Moreno, Laura et al. "Automatic Generation of Release Notes," In Proceedings of the 22nd ACM SIGSOFT International Symposium on Foundations of Software Engineering, Nov. 11, 2014, pp. 484-495, DOI: 10.1145/2635868.2635870.

Non Final Office Action for U.S. Appl. No. 17/201,704, dated Feb. 4, 2022, (37 pages), United States Patent and Trademark Office, USA.

Non Patent Office Action for U.S. Appl. No. 17/201,692, dated Mar. 3, 2022, (22 pages), United States Patent and Trademark Office, USA.

NonFinal Office Action for U.S. Appl. No. 17/201,696, dated Oct. 14, 2021, (24 pages), United States Patent and Trademark Office, USA.

Notice of Allowance and Fee(s) Due for U.S. Appl. No. 17/201,692, dated Jun. 20, 2022, (15 pages), U.S. Patent and Trademark Office, US.

Notice of Allowance and Fee(s) Due for U.S. Appl. No. 17/201,704, dated Jun. 9, 2022, (15 pages), U.S. Patent and Trademark Office, US.

Pujol, Johan. "Create Automatic Release Notes On AzureDevOps," Digikare, Jan. 24, 2019, (5 pages), (article, online), [Retrieved from the Internet Jun. 14, 2021] <https://medium.com/digikare/create-automatic-release-notes-on-azuredevops-f235376ec533>.

Szabo, Levente. "Save Time Emailing Release Notes From Jira Automatically," Midori, Oct. 15, 2018, (8 pages), (article, online), [Retrieved from the Internet Jun. 14, 2021] <https://www.midori-global.com/blog/2018/10/15/save-time-compiling-release-notes-with-automation-for-Jira-and-better-pdf-automation-for-jira>.

NonFinal Office Action for U.S. Appl. No. 17/822,203, dated Dec. 7, 2022, (16 pages), United States Patent and Trademark Office, US.

NonFinal Office Action for U.S. Appl. No. 17/201,696, dated Jan. 10, 2023, United States Patent and Trademark Office, US.

Final Office Action for U.S. Appl. No. 17/822,203, dated May 3, 2023, (14 pages), United States Patent and Trademark Office, US.

Final Office Action for U.S. Appl. No. 17/201,696, dated Jun. 14, 2023, (28 pages), United States Patent and Trademark Office, US.

NonFinal Office Action for U.S. Appl. No. 17/822,203, dated Sep. 8, 2023, (13 pages), United States Patent and Trademark Office, US.

\* cited by examiner

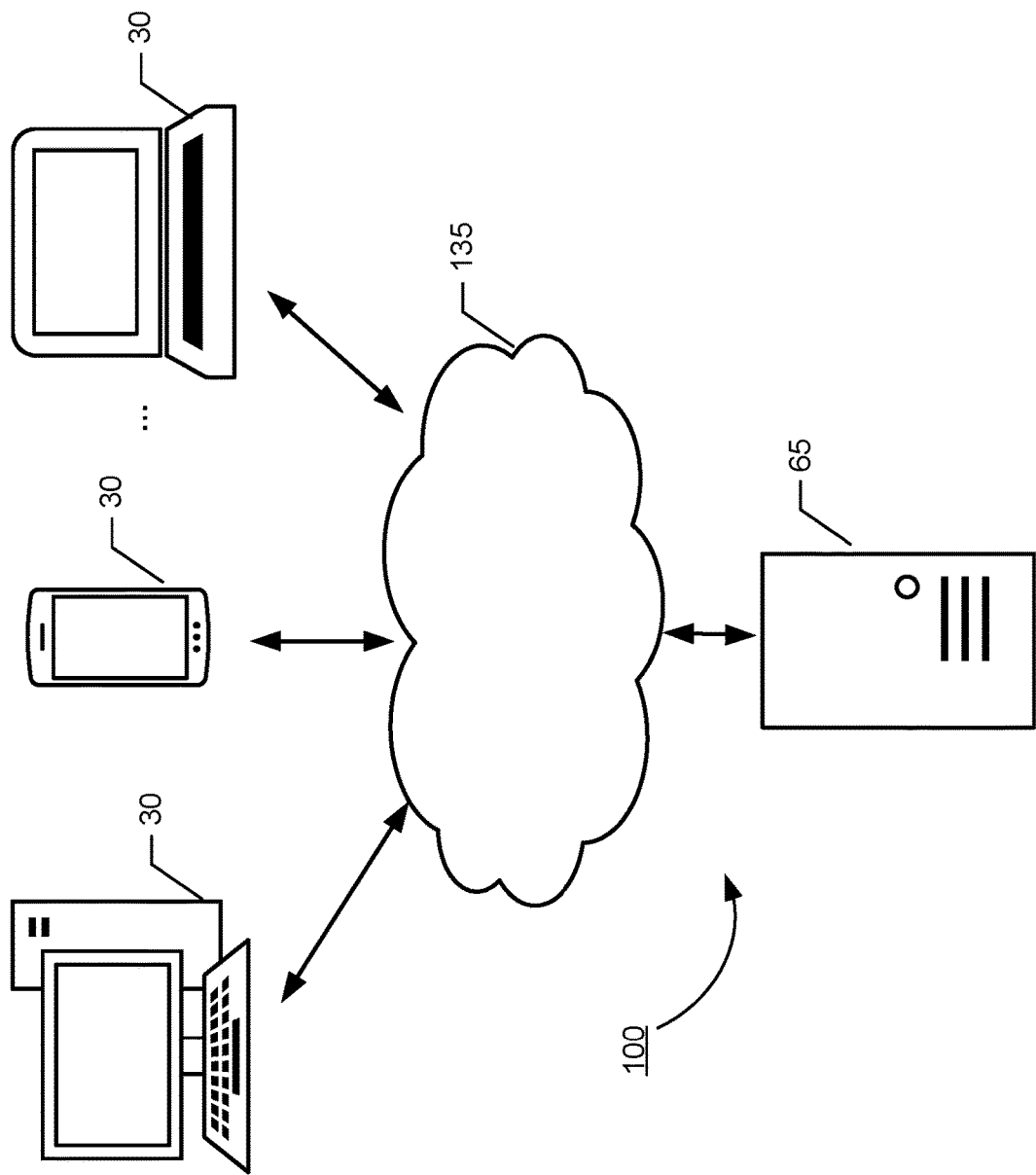

MODULAR SOFTWARE APPLICATION CONFIGURATION MANAGEMENT

CROSS-REFERENCES TO RELATED APPLICATIONS

The present application is a continuation of U.S. patent application Ser. No. 17/201,692 filed Mar. 15, 2021, which claims priority to U.S. Provisional Patent Application No. 62/989,233, filed Mar. 13, 2020, each of which is incorporated herein by reference in its entirety.

TECHNOLOGICAL FIELD

Embodiments of the present disclosure relate generally to software application configuration management. In particular, examples of the present application provide a modular approach to preparing, customizing, and/or validating images for software application (including, but not limited to, operating systems and/or third-party applications) by utilizing one more configuration modules that are specific to the software application and/or to the client system.

BACKGROUND

Applicant has identified many technical challenges and limitations associated with software application configuration management.

BRIEF SUMMARY

In general, embodiments of the present disclosure provide methods, apparatuses, systems, computing devices, computing entities, and/or the like.

In accordance with various embodiments of the present disclosure, an apparatus is provided. The apparatus may comprise at least one processor and at least one non-transitory memory comprising a computer program code. The at least one non-transitory memory and the computer program code may be configured to, with the at least one processor, cause the apparatus to determine per-application configuration data associated with a software application; determine per-client configuration data associated with a client system; determine per-application per-client configuration data associated with the software application and the client system; generate modular configuration data based at least in part on at least one of the per-application configuration data, the per-client configuration data, and the per-application per-client configuration data; generate a releasable software application based at least in part on the modular configuration data; and perform one or more software release operations by transmitting the releasable software application to the client system.

In some embodiments, the per-application configuration data comprises at least one per-application configuration module indicating at least one post-development modification operation specific to the software application.

In some embodiments, the per-application configuration data comprises at least one per-application configuration module indicating at least one post-development testing operation specific to the software application.

In some embodiments, when determining the per-application configuration data, the at least one non-transitory memory and the computer program code are configured to, with the at least one processor, cause the apparatus to: determine at least one software application group associated with the software application; and determine the per-application configuration data based at least in part on the at least one software application group.

In some embodiments, the per-client configuration data comprises at least one per-client configuration module indicating at least one post-development modification operation specific to the client system.

In some embodiments, the per-client configuration data comprises at least one per-client configuration module indicating at least one post-development testing operation specific to the client system.

In some embodiments, when determining the per-client configuration data, the at least one non-transitory memory and the computer program code are configured to, with the at least one processor, cause the apparatus to: determine at least one client system group associated with the client system; and determine the per-client configuration data based at least in part on the at least one client system group.

In some embodiments, the per-application per-client configuration data comprises at least one per-application per-client configuration module indicating at least one post-development modification operation specific to both the software application and the client system.

In some embodiments, the per-application per-client configuration data comprises at least one per-application per-client configuration module indicating at least one post-development testing operation specific to both the software application and the client system.

In some embodiments, the modular configuration data defines at least an operational sequence based at least in part on at least one operational group associated with at least one post-development modification operation or at least one post-development testing operation.

In some embodiments, the modular configuration data defines at least an operational sequence based at least in part on at least one hierarchical ranking associated with one or more of per-application configuration module, per-client configuration module, or per-application per-client configuration module.

In some embodiments, the modular configuration data defines at least an operational sequence based at least in part on subject matter domain data indicating at least one of: at least one functionality dependence associated with at least one post-development modification operation or at least one post-development testing operation, or at least one modular dependence associated with one or more of per-application configuration module, per-client configuration module, or per-application per-client configuration module.

In accordance with various embodiments of the present disclosure, a computer-implemented method is provided. The computer-implemented method may comprise determining per-application configuration data associated with a software application; determining per-client configuration data associated with a client system; determining per-application per-client configuration data associated with the software application and the client system; generating modular configuration data based at least in part on at least one of the per-application configuration data, the per-client configuration data, and the per-application per-client configuration data; generating a releasable software application based at least in part on the modular configuration data; and performing one or more software release operations by transmitting the releasable software application to the client system.

In some embodiments, the per-application configuration data comprises at least one per-application configuration module indicating at least one post-development modification operation specific to the software application.

In some embodiments, the per-application configuration data comprises at least one per-application configuration module indicating at least one post-development testing operation specific to the software application.

In some embodiments, determining the per-application configuration data further comprises: determining at least one software application group associated with the software application; and determining the per-application configuration data based at least in part on the at least one software application group.

In some embodiments, the per-client configuration data comprises at least one per-client configuration module indicating at least one post-development modification operation specific to the client system.

In some embodiments, the per-client configuration data comprises at least one per-client configuration module indicating at least one post-development testing operation specific to the client system.

In some embodiments, determining the per-client configuration data further comprises: determining at least one client system group associated with the client system; and determining the per-client configuration data based at least in part on the at least one client system group.

In accordance with various embodiments of the present disclosure, a computer program product is provided. The computer program product may comprise at least one non-transitory computer-readable storage medium having computer-readable program code portions stored therein. The computer-readable program code portions may comprise an executable portion configured to determine per-application configuration data associated with a software application; determine per-client configuration data associated with a client system; determine per-application per-client configuration data associated with the software application and the client system; generate modular configuration data based at least in part on at least one of the per-application configuration data, the per-client configuration data, and the per-application per-client configuration data; generate a releasable software application based at least in part on the modular configuration data; and perform one or more software release operations by transmitting the releasable software application to the client system.

The above summary is provided merely for purposes of summarizing some example embodiments to provide a basic understanding of some aspects of the disclosure. Accordingly, it will be appreciated that the above-described embodiments are merely examples. It will be appreciated that the scope of the disclosure encompasses many potential embodiments in addition to those here summarized, some of which will be further described below.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 1 is an example diagram of an example system that can be used in conjunction with various embodiments of the present invention;

DETAILED DESCRIPTION OF SOME EXAMPLE EMBODIMENTS

Figure 2A:
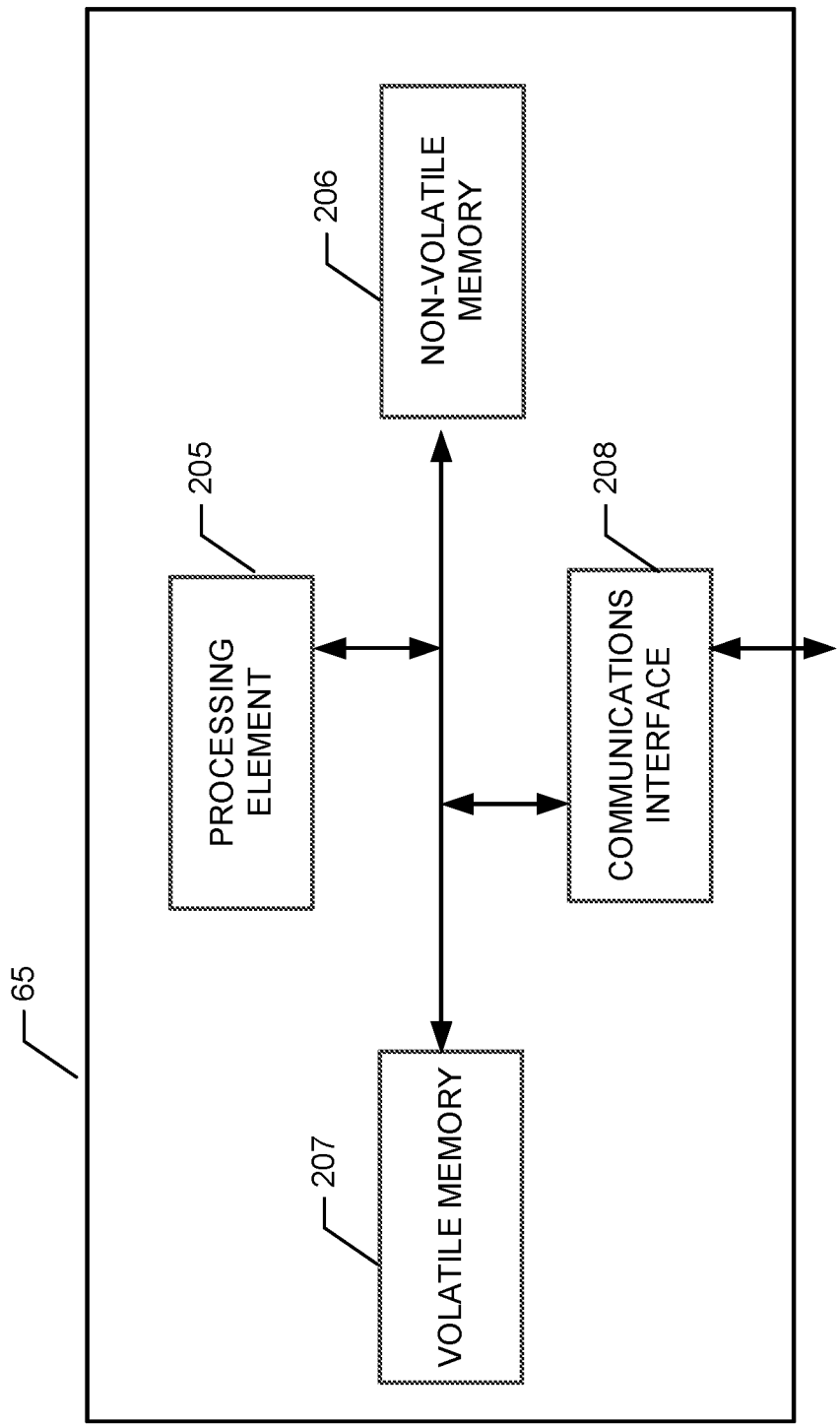
FIG. 2A is an example schematic representation of an example central computing entity in accordance with certain embodiments of the present invention.

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" (also designated as "I") is used herein in both the alternative and conjunctive sense, unless otherwise indicated. The terms "illustrative" and "exemplary" are used to be examples with no indication of quality level. Like numbers may refer to like elements throughout.

I. Overview

Various embodiments of the present disclosure relate generally to software application configuration management. In particular, examples of the present disclosure provide a modular approach to preparing, customizing, and/or validating images for software application (including, but not limited to, operating systems and/or third-party applications).

As described above, there are technical challenges, deficiencies and problems associated with software application configuration management. In a hybrid environment where software applications are associated with a plurality of different formats, managing configurations of these software applications can be challenging. For example, many systems may require a system administrator to create a configuration file for each software application, which not only is time and resource consuming but also may introduce human error in the configuration file, resulting in the configuration file incompatible with the client system or non-executable on the client system. As another example, when multiple configuration files are generated and used with respect to a software application, many systems fail to consider the dependency of these configuration files, resulting in the configuration files being executed out of order and may cause damage to the software application. These in turn make various existing software application configuration management solutions operationally unreliable and computationally inefficient, which in some embodiments undermines the efficiency of the deployed software applications.

Various embodiments of the present disclosure overcome the above-referenced technical challenges, deficiencies and problems, including the challenges associated with the operational reliability and computational efficiency of various existing software application configuration management solutions as well as the challenges associated with the efficiency of the deployed software applications. For example, various embodiments of the present disclosure provide methods, apparatus, and systems for utilizing a combination of per-application configuration data, per-client application configuration data, and per-client-per-application configuration data to generate modular configuration data. The modular configuration data may be generated by a modular software application configuration management platform/system automatically and without the need for manual intervention. In some embodiments, the modular configuration data may include a sequenced timeline of software application release action items (e.g., software application modifications and/or testing) to be performed before deployment of the software application to the client system. As such, various embodiments of the present disclosure reduce duplication and infrastructure cost, improve collaboration and resource usage efficiency, and increase predictability and/or consistency of operations in software application configuration management. In doing so, various embodiments of the present invention improve operational reliability and computational efficiency of various existing software application configuration management solutions and improve the efficiency of the deployed software applications.

II. Definitions

In the present disclosure, the term "data object" may refer to a data structure that represents one or more functionalities and/or characteristics (e.g., feature) associated with data and/or information. In some embodiments, the data object may comprise one or more metadata. The term "metadata" may refer to a parameter, a data field, a data element, or the like that describes an attribute of a data object. In some embodiments, metadata may include text string(s), numerical character(s), alphabetical character(s), alphanumeric code(s), American Standard Code for Information Interchange (ASCII) character(s), and/or the like.

In the present disclosure, the term "image" may refer to a data object that represents a replica of data, information, configurations, and/or contents that are stored in a physical computer storage device (such as, but is not limited to, a hard disk drive, a compact disc read-only memory (CD-ROM, and/or the like) and/or a virtual storage system (for example, in a cloud computing environment where multiple network storage devices are interconnected with one another).

An example image in accordance with the present disclosure may be generated to represent a virtual machine that can be deployed in an enterprise environment. In an example enterprise environment, system administrator(s) manage a high number of servers that are configured to deliver applications and/or services to others (such as, but is not limited to, another user within the same organization, a consumer that is outside the organization, and/or the like). By generating, customizing, validating, and deploying images, system administrator(s) in the example enterprise environment are able to reduce duplication and infrastructure cost, improve collaboration and resource usage efficiency, and increase predictability and/or consistency of operations in the example enterprise environment.

In some embodiments, an image may be generated, stored and/or transmitted in a non-volatile form. In some embodiments, an image may be generated, stored, and/or transmitted in the format of a disk image file (such as an optical disc image (ISO) file). In some embodiments, an image may be generated, stored, and/or transmitted as a computer file that is formatted in accordance with the specifications of one or more computer visualization and/or emulation applications. For example, an image may be generated, stored, and/or transmitted in the format of an Open Virtualization Appliance (OVA) file, which may be used by visualization/emulation applications such as VMware® (which, additionally, or alternatively, may be installed on premises in a network computing system). As another example, an image may be generated, stored, and/or transmitted in the format of an Amazon Machine Image (AMI) file, which may be used by Amazon® Simple Storage Service (S3) for storage (which is stored in a cloud computing storage). As another example, an image may be generated, stored, and/or transmitted in the format of a Virtual Machine Image (VMI) file, which may be used by cloud computing services such as, but is not limited to, Microsoft® Azure®.

In some embodiments, once an image is generated (for example, by the system administrator(s)), the image may be transmitted through one or more networked computing systems for deployment and/or distribution to a client system. For example, an example image may be deployed and/or distributed to a cloud environment, computing system and/or service such as, but is not limited to, Amazon® Web Service, Microsoft® Azure® Shared Image Gallery, and/or the like. In such an example, the cloud computing system and/or service comprise a plurality of remote servers that are configured to enable multiple client systems within the enterprise environment (within the same region or across different regions), and/or outside the enterprise environment, to operate, access, and/or utilize the image. As another example, an example image may be deployed and/or distributed through a local, on-premise computer network that is within the enterprise environment to multiple client systems within the enterprise environment (within the same region or across different regions), and/or client systems outside the enterprise environment when the local, on-premise computer network is connected to the Internet.

In accordance with various embodiments of the present disclosure, an example image may be associated with at least one software application. For example, an example image may comprise data, information, configurations, and/or contents that are related to the at least one software application. In the present disclosure, the terms "software" or "software application" may refer to a collection of computing instructions and data that can be executed by a processing circuitry (for example, a processor) to conduct one or more operations, perform one or more services, and provide one or more functionalities. For example, a software application may be in the form of an operating system, which is a software application that manages the hardware and/or resource of a computing device and provides one or more basic functions (such as, but not limited to, scheduling tasks, executing applications, and controlling peripherals). As another example, a software application may be in the form of a third-party application, which may be installed on the operating system to expand the functions of the computing device.

In some embodiments, an example image may comprise data, information, configurations, and/or contents that are associated with an example operating system. Examples of operating systems may include, are not limited to, server operating system such as, but not limited to, Windows Server 2016®, Windows Sever 2019®, Linux, Ubuntu, and/or the like.

While the description above provides examples of operating systems that may be implemented in accordance with embodiments of the present disclosure, it is noted that the scope of the present disclosure is not limited to the description above. For example, examples of operating systems may include computer operating systems (such as, but not limited to, Microsoft® Windows®, Apple® MacOS®, Unix, Linus, etc.), smart phone operating systems (such as, but not limited to, Apple® iOS®, Google® Android®), tablet operating systems (such as, but not limited to, Apple® iPadOS®), wearable operating systems (such as, but not limited to, Apple® WatchOS®), and/or the like.

Additionally, or alternatively, an example image may comprise data, information, configurations, and/or contents that are associated with one or more third-party applications. For example, an example image may comprise third-party applications that are required to deliver a service or a portion of a service to a client system. For example, an example image may comprise data, information, configurations, and/or contents associated with an antivirus software application that is configured to prevent, detect, and/or remove computer virus, spyware, malware, and/or the like. Additionally, or alternatively, an example image may comprise data, information, configurations, and/or contents that are associated with productivity software applications that are configured to provide functionalities such as, but not limited to, word processing functionalities, spreadsheet calculation functionalities, presentation generation functionalities, database functionalities, email/communication functionalities, and/or the like. Additionally, or alternatively, an example image may comprise data, information, configurations, and/or contents that are associated with other applications.

In the present disclosure, the term "base image" may refer to an image that is associated with at least one software application (such as, but not limited to, an operating system, one or more third-party applications) as described above. For example, the base image may be an image of a server operating system such as, but not limited to, Windows Server 2016®, Windows Sever 2019®, Linux, Ubuntu, and/or the like. Additionally, or alternatively, the base image may be an image of one or more third-party applications, such as, but not limited to, an antivirus software application, a productivity software application, and/or the like. Additionally, or alternatively, the base image may be an image of both an operating system and one or more third-party applications, where the one or more third-party applications are installed on the operating system.

In some embodiments, an example base image of a software application may include all of the latest software configuration files for the software application. For example, an image of a Microsoft® Windows® software application may include the latest security patches that fix one or more vulnerabilities in the operating system. As another example, an image of a Ubuntu® software application may include the latest security patches that fix one or more vulnerabilities in the operating system.

In some embodiments, an example base image may be generated by updating a raw base image. In the present disclosure, the term "raw base image" may refer to an image that may or may not include all of the latest software configurations for the software application. For example, a raw base image may not include the latest security patches that fix one or more vulnerabilities in the operating system. In some embodiments, a computing entity (such as the central computing entity 65 described herein) may be configured to update the raw base image of the software application by installing the required latest software configuration files for the software application. For example, the computing entity may retrieve the latest security patches for a raw base image of a Windows® operating system and update the raw base image by applying the latest security patches to generate a base image for the Windows® operating system. As another example, the computing entity may retrieve the latest security patches for a raw base image of an Ubuntu® operating system and update the raw base image by applying the latest security patches to generate a base image for the Ubuntu® operating system.

In the present disclosure, the term "customized base image" may refer to an image that is generated by conducting at least one operational verification operation on a base image. In some embodiments, an image is either modified or operationally verified or both in order to generate a customized base image.

In the present disclosure, an "operational verification operation" may refer to a data object that describes a required modification on the software applications and/or the images associated with software applications, and/or or a required testing operation for the software applications and/or the images associated with software applications so that the resulting customized base image satisfies one or more requirements (for example, requirements from the enterprise environment, form the end user, and/or the like).

In some embodiments, an operational verification operation may be a modification operation. In the present disclosure, a "modification operation" may refer to a data operation on an image (for example, a base image) and/or a software application (for example, operating system, third-party application) that modifies one or more parameters of the image and/or software application, such that resulting image (for example, a customized base image) and/or software application satisfies the requirements from the enterprise environment, form the end user, and/or the like. For example, in conducting a modification operation, a processing circuitry may unpack the base image and extract one or more files from the base image. Examples of modification operations may include, but not limited to, editing one or more files within the base image, removing the one or more files within the base images, adjusting the settings of one or more files within the base image, and/or the like.

In some embodiments, an operational verification operation may be a testing operation. In the present disclosure, a "testing operation" may refer to a data operation on the image (for example, base image) and/or a software application (for example, operating system, third-party application) that tests the image and/or the software application, such that resulting image (for example, a customized base image) and/or the software application satisfies the requirements from the enterprise environment, form the end user, and/or the like. For example, in conducting a testing operation, a processing circuitry may create a sandbox environment, execute the image and/or the software application, and determine whether one or more errors have occurred.

In the present disclosure, the term "configuration module" may refer to a data object that describes one or more operational verification operations, such as one or more post-development modification operations that should be conducted on a corresponding software application or an image prior to release/deployment of the software application or the image on the client system, and/or one or more post-development testing operations that correspond to the one or more post-development modification operations. In some embodiments, when a configuration module is executed by a processing circuitry, the processing circuitry may carry out modification operation(s) and testing operation(s) to modify and/or test an image in accordance with those described by the configuration module. For example, a configuration module may be in the form of a file with scripted steps and logic to reach a goal (modification, testing, etc.)

In the present disclosure, the term "validated base image" may refer to an image that is generated by conducting at least one operational testing operation on a customized base image. In the present disclosure, an "operational testing operation" may refer to a data object that describes a universal testing that is required for all software applications and/or images associated with said software applications prior to deploying/releasing software applications and/or images to any environment (for example, any client system) to ensure that the resulting validated base image satisfies one or more requirements (for example, requirements from the enterprise environment, form the end user, and/or the like).

For example, the operational testing operation may be in the form of a general testing operation, which is a type of testing operation for all the images and/or software applications regardless of different formats of the images and/or software applications, and regardless of different operating systems associated with the images and/or the software applications. As an example, a general testing operation may be a security scan on the customized base image. In some embodiments, if the customized base image successfully passes the general testing operation, a processing circuitry may determine that the customized base image is a validated base image. In some embodiments, if the customized based image does not pass the general testing operation, a processing circuitry may determine that the customized base image is not a validated base image, and may further generate a validated base image by conducting one or more modification operations on the customized base image so that it passes the general testing operation.

As another example, the operational testing operation may be in the form of an integration testing operation, which is a type of testing operation that is configured to test the compatibilities of various modification operations that have been conducted on the software application and/or on the image after the software application and/or the image has been developed (for example, those modifications as described by the configuration module). As an example, an integration testing operation may be a compatibility check on the customized base image. In some embodiments, if the customized base image successfully passes the integration testing operation, a processing circuitry may determine that the customized base image is a validated base image. In some embodiments, if the customized based image does not pass the integration testing operation, a processing circuitry may determine that the customized base image is not a validated base image, and may further generate a validated base image by conducting one or more modification operations on the customized base image so that it passes the integration testing operation.

In the present disclosure, the term "release note data object" may refer to a data object that comprises data and/or information describing the content associated with an image and/or a software application that is to be deployed or released to one or more client systems (for example, a validated base image as described above). In various embodiments of the present disclosure, release note data objects may have different structures and/or formats.

In some embodiments, the release note data object may have a structured document format, such as a JavaScript Object Notation (JSON) or Extensible Markup Language (XML) format, and may define desired data item types using structured tags (e.g., JSON tags or XML tags) within the structured document tag.

In some embodiments, the release note data object may be in the form of text string(s), numerical character(s), alphabetical character(s), alphanumeric code(s), American Standard Code for Information Interchange (ASCII) character(s), and/or the like. For example, the release note data object may be in the form of, such as but not limited to, an electronic message, an electronic mail, a short message service (SMS) message, and/or the like. As another example, the release note data object may be in the form of, such as but not limited to, a text file such as .txt and/or a Microsoft Word file.

In some embodiments, the release note data object may comprise computing instructions that, when executed by the client system, cause the client system to carry out one or more operations such as, but not limited to, triggering the display of a notification that indicates the release/deployment of the image (for example, a validated base image) and/or the software application, and/or a notification that describes the content associated with an image and/or a software application that is to be deployed or released to one or more client systems (for example, a validated base image as described above).

As used herein, the term "module" may be a data object that comprises a self-contained collection of data and instructions for a set of configuration operations associated with the module. An example of a module is a software virtualization container, such as a Docker container.

III. Computer Program Products, Methods, and Computing Entities

Embodiments of the present invention may be implemented in various ways, including as computer program products that comprise articles of manufacture. Such computer program products may include one or more software components including, for example, software objects, methods, data structures, and/or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of a data structure, apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

IV. Exemplary System Architecture

FIG. 1 provides an illustration of a modular software application configuration management platform/system 100 that can be used in conjunction with various embodiments of the present invention. As shown in FIG. 1, the modular software application configuration management platform/system 100 may comprise one or more central computing entities 65, one or more user computing entities 30, one or more networks 135, and/or the like. Each of the components of the system may be in electronic communication with, for example, one another over the same or different wireless or wired networks 135 including, for example, a wired or wireless Personal Area Network (PAN), Local Area Network (LAN), Metropolitan Area Network (MAN), Wide Area Network (WAN), and/or the like. Additionally, while FIG. 1 illustrate certain system entities as separate, standalone entities, the various embodiments are not limited to this particular architecture.

a. Exemplary Central Computing Entity

FIG. 2A provides a schematic of a central computing entity 65 according to one embodiment of the present invention. In general, the terms computing entity, entity, device, system, and/or similar words used herein interchangeably may refer to, for example, one or more computers, computing entities, desktop computers, mobile phones, tablets, phablets, notebooks, laptops, distributed systems, items/devices, terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the central computing entity 65 may also include one or more network and/or communications interfaces 208 for communicating with various computing entities, such as by communicating data, content, information, and/or similar terms used herein interchangeably that can be transmitted, received, operated on, processed, displayed, stored, and/or the like. For instance, the central computing entity 65 may communicate with other computing entities, one or more user computing entities 30 (also referred to as "client system" herein), and/or the like.

As shown in FIG. 2A, in one embodiment, the central computing entity 65 may include or be in communication with one or more processing elements 205 (also referred to as processors, processing circuitry, and/or similar terms used herein interchangeably) that communicate with other elements within the central computing entity 65 via a bus, for example, or network connection. As will be understood, the processing element 205 may be embodied in a number of different ways. For example, the processing element 205 may be embodied as one or more complex programmable logic devices (CPLDs), microprocessors, multi-core processors, coprocessing entities, application-specific instruction-set processors (ASIPs), and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present invention when configured accordingly.

In one embodiment, the central computing entity 65 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 206 as described above, such as hard disks, ROM, PROM, EPROM, EEPROM, flash memory, MMCs, SD memory cards, Memory Sticks, CBRAM, PRAM, FeRAM, RRAM, SONOS, racetrack memory, and/or the like. As will be recognized, the non-volatile storage or memory media may store databases, metadata repositories database instances, database management system entities, data, applications, programs, program modules, scripts, source code, object code, byte code, compiled code, interpreted code, machine code, executable instructions, and/or the like. The term database, database instance, database management system entity, and/or similar terms used herein interchangeably and in a general sense to may refer to a structured or unstructured collection of information/data that is stored in a computer-readable storage medium.

Memory media 206 (e.g., metadata repository) may also be embodied as a data storage device or devices, as a separate database server or servers, or as a combination of data storage devices and separate database servers. Further, in some embodiments, memory media 206 may be embodied as a distributed repository such that some of the stored information/data is stored centrally in a location within the system and other information/data is stored in one or more remote locations. Alternatively, in some embodiments, the distributed repository may be distributed over a plurality of remote storage locations only. An example of the embodiments contemplated herein would include a cloud data storage system maintained by a third party provider and where some or all of the information/data required for the operation of the system may be stored. In some embodiments, the information/data required for the operation of the system may also be partially stored in the cloud data storage system and partially stored in a locally maintained data storage system.

Figure 2B:
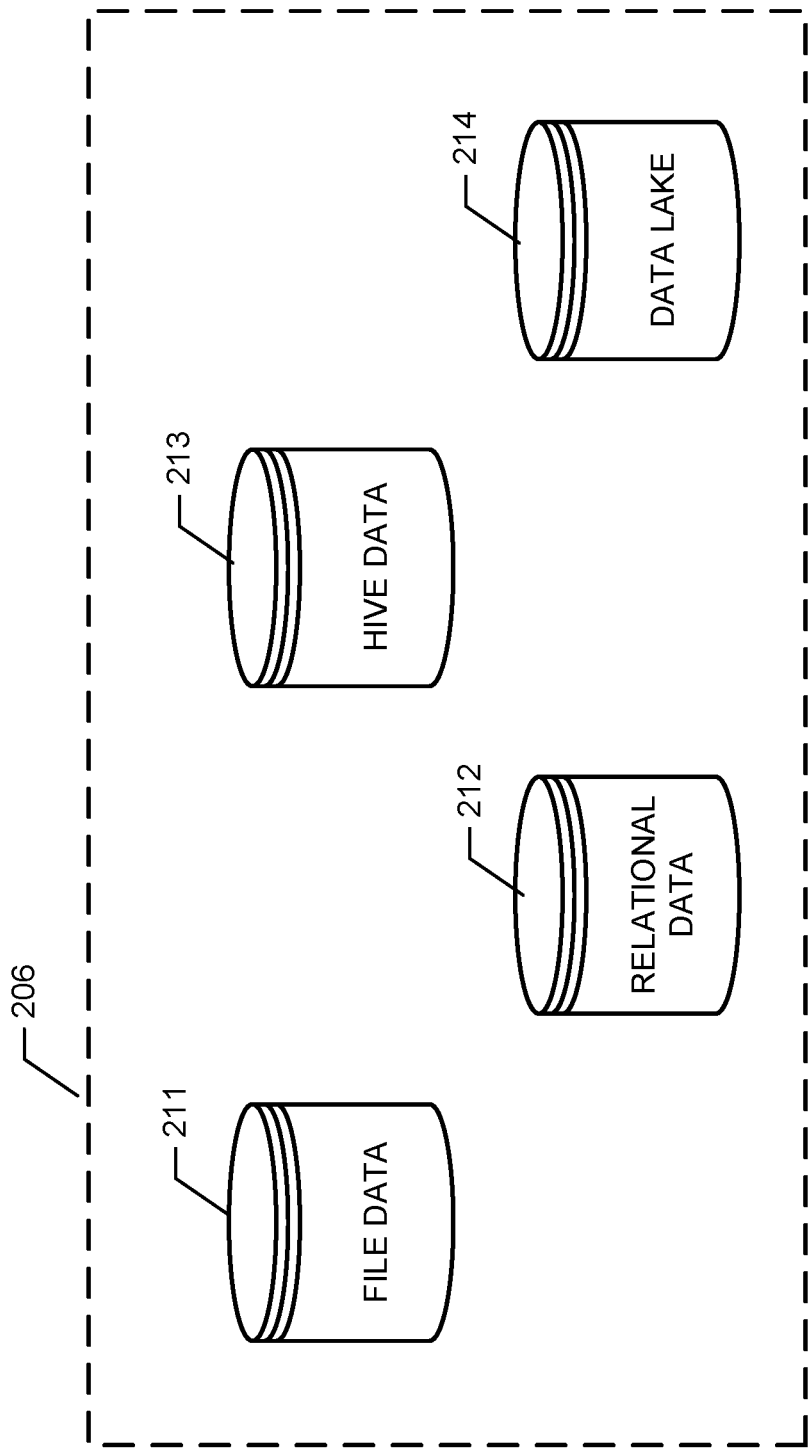
FIG. 2B is an example schematic representation of an example memory media storing a plurality of data assets.

Memory media 206 (e.g., metadata repository) may include information/data accessed and stored by the system to facilitate the operations of the system. More specifically, memory media 206 may encompass one or more data stores configured to store information/data usable in certain embodiments. For example, as shown in FIG. 2B, metadata for data assets may be stored in metadata repositories encompassed within the memory media 206. The metadata for the data assets in the metadata data stores, metadata repositories, and similar words used herein interchangeably may comprise file information/data 211, relational information/data 212, Hive information/data 213, data lake information/data 214, and/or various other types of information/data.

In one embodiment, the central computing entity 65 may further include or be in communication with volatile media (also referred to as volatile storage, memory, memory storage, memory circuitry and/or similar terms used herein interchangeably). In one embodiment, the volatile storage or memory may also include one or more volatile storage or memory media 207 as described above, such as RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. As will be recognized, the volatile storage or memory media may be used to store at least portions of the databases, database instances, database management system entities, data, applications, programs, program modules, scripts, source code, object code, byte code, compiled code, interpreted code, machine code, executable instructions, and/or the like being executed by, for example, the processing element 308. Thus, the databases, database instances, database management system entities, data, applications, programs, program modules, scripts, source code, object code, byte code, compiled code, interpreted code, machine code, executable instructions, and/or the like may be used to control certain aspects of the operation of the central computing entity 65 with the assistance of the processing element 205 and operating system.

As indicated, in one embodiment, the central computing entity 65 may also include one or more network and/or communications interfaces 208 for communicating with various computing entities, such as by communicating data, content, information, and/or similar terms used herein interchangeably that can be transmitted, received, operated on, processed, displayed, stored, and/or the like. For instance, the central computing entity 65 may communicate with computing entities or communication interfaces of other central computing entities 65, user computing entities 30, and/or the like.

As indicated, in one embodiment, the central computing entity 65 may also include one or more network and/or communications interfaces 208 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the central computing entity 65 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol. The central computing entity 65 may use such protocols and standards to communicate using Border Gateway Protocol (BGP), Dynamic Host Configuration Protocol (DHCP), Domain Name System (DNS), File Transfer Protocol (FTP), Hypertext Transfer Protocol (HTTP), HTTP over TLS/SSL/Secure, Internet Message Access Protocol (IMAP), Network Time Protocol (NTP), Simple Mail Transfer Protocol (SMTP), Telnet, Transport Layer Security (TLS), Secure Sockets Layer (SSL), Internet Protocol (IP), Transmission Control Protocol (TCP), User Datagram Protocol (UDP), Datagram Congestion Control Protocol (DCCP), Stream Control Transmission Protocol (SCTP), HyperText Markup Language (HTML), and/or the like.

As will be appreciated, one or more of the central computing entity's components may be located remotely from other central computing entity 65 components, such as in a distributed system. Furthermore, one or more of the components may be aggregated and additional components performing functions described herein may be included in the central computing entity 65. Thus, the central computing entity 65 can be adapted to accommodate a variety of needs and circumstances.

b. Exemplary User Computing Entity

Figure 3:
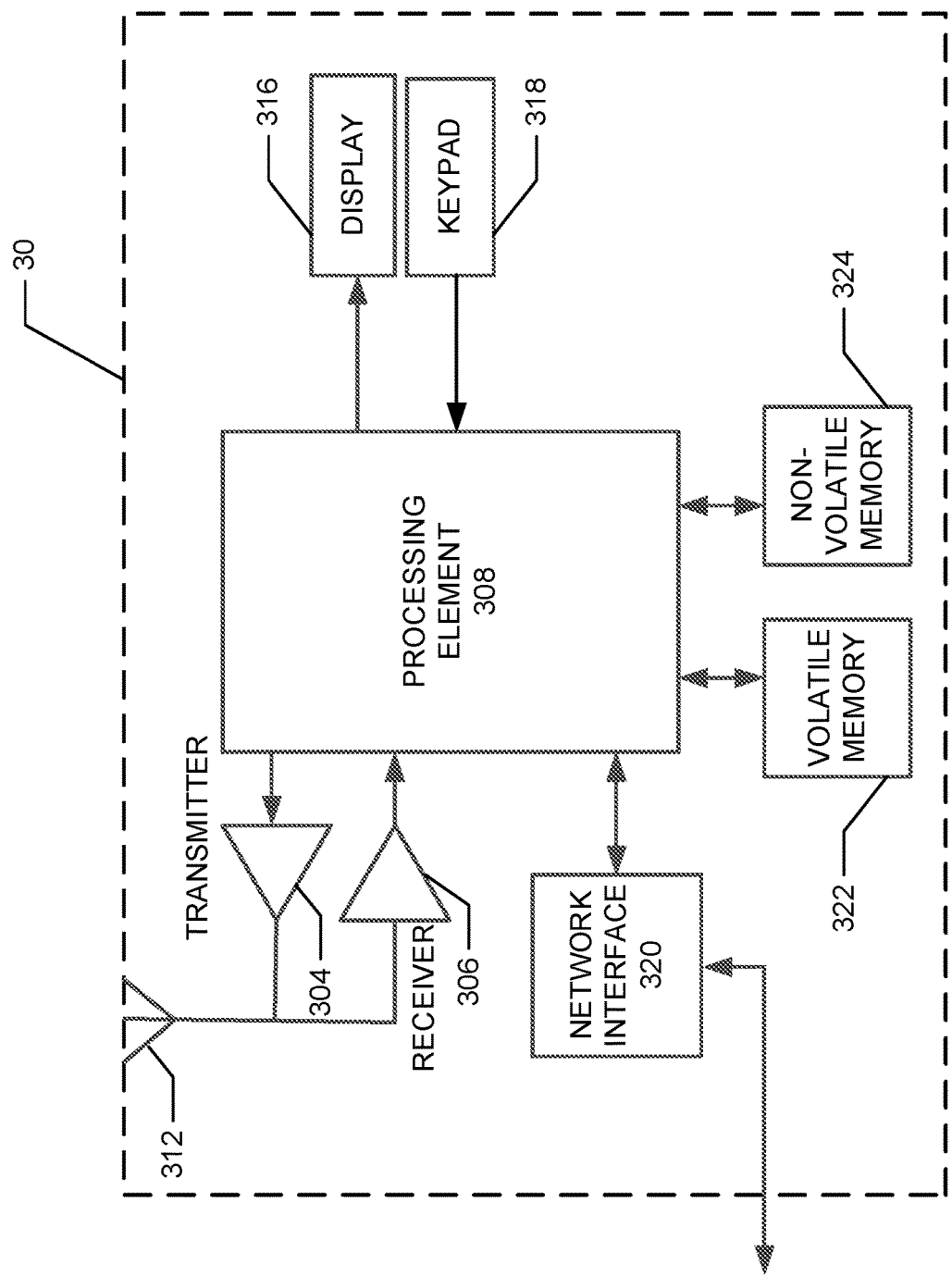
FIG. 3 is an example schematic representation of an example user computing entity in accordance with certain embodiments of the present invention.

FIG. 3 provides an illustrative schematic representative of user computing entity 30 that can be used in conjunction with embodiments of the present invention. As will be recognized, the user computing entity may be operated by an agent and include components and features similar to those described in conjunction with the central computing entity 65. Further, as shown in FIG. 3, the user computing entity may include additional components and features. For example, the user computing entity 30 can include an antenna 312, a transmitter 304 (e.g., radio), a receiver 306 (e.g., radio), and a processing element 308 that provides signals to and receives signals from the transmitter 304 and receiver 306, respectively. The signals provided to and received from the transmitter 304 and the receiver 306, respectively, may include signaling information/data in accordance with an air interface standard of applicable wireless systems to communicate with various entities, such as a central computing entity 65, another user computing entity 30, and/or the like. In this regard, the user computing entity 30 may be capable of operating with one or more air interface standards, communication protocols, modulation types, and access types. More particularly, the user computing entity 30 may comprise a network interface 320, and may operate in accordance with any of a number of wireless communication standards and protocols. In a particular embodiment, the user computing entity 30 may operate in accordance with multiple wireless communication standards and protocols, such as GPRS, UMTS, CDMA2000, 1×RTT, WCDMA, TD-SCDMA, LTE, E-UTRAN, EVDO, HSPA, HSDPA, Wi-Fi, WiMAX, UWB, IR protocols, Bluetooth protocols, USB protocols, and/or any other wireless protocol.

Via these communication standards and protocols, the user computing entity 30 can communicate with various other entities using concepts such as Unstructured Supplementary Service data (USSD), Short Message Service (SMS), Multimedia Messaging Service (MMS), Dual-Tone Multi-Frequency Signaling (DTMF), and/or Subscriber Identity Module Dialer (SIM dialer). The user computing entity 30 can also download changes, add-ons, and updates, for instance, to its firmware, software (e.g., including executable instructions, applications, program modules), and operating system.

According to one embodiment, the user computing entity 30 may include location determining aspects, devices, modules, functionalities, and/or similar words used herein interchangeably. For example, the user computing entity 30 may include outdoor positioning aspects, such as a location module adapted to acquire, for example, latitude, longitude, altitude, geocode, course, direction, heading, speed, UTC, date, and/or various other information/data. In one embodiment, the location module can acquire data, sometimes known as ephemeris data, by identifying the number of satellites in view and the relative positions of those satellites. The satellites may be a variety of different satellites, including LEO satellite systems, DOD satellite systems, the European Union Galileo positioning systems, the Chinese Compass navigation systems, Indian Regional Navigational satellite systems, and/or the like. Alternatively, the location information/data/data may be determined by triangulating the position in connection with a variety of other systems, including cellular towers, Wi-Fi access points, and/or the like. Similarly, the user computing entity 30 may include indoor positioning aspects, such as a location module adapted to acquire, for example, latitude, longitude, altitude, geocode, course, direction, heading, speed, time, date, and/ or various other information/data. Some of the indoor aspects may use various position or location technologies including RFID tags, indoor beacons or transmitters, Wi-Fi access points, cellular towers, nearby computing devices (e.g., smartphones, laptops) and/or the like. For instance, such technologies may include iBeacons, Gimbal proximity beacons, BLE transmitters, Near Field Communication (NFC) transmitters, and/or the like. These indoor positioning aspects can be used in a variety of settings to determine the location of someone or something to within inches or centimeters.

The user computing entity 30 may also comprise a user interface comprising one or more user input/output interfaces (e.g., a display 316 and/or speaker/speaker driver coupled to a processing element 308 and a touch screen, keyboard, mouse, and/or microphone coupled to a processing element 308). For example, the user output interface may be configured to provide an application, browser, user interface, dashboard, webpage, and/or similar words used herein interchangeably executing on and/or accessible via the user computing entity 30 to cause display or audible presentation of information/data and for user interaction therewith via one or more user input interfaces. The user output interface may be updated dynamically from communication with the central computing entity 65. The user input interface can comprise any of a number of devices allowing the user computing entity 30 to receive data, such as a keypad 318 (hard or soft), a touch display, voice/speech or motion interfaces, scanners, readers, or other input device. In embodiments including a keypad 318, the keypad 318 can include (or cause display of) the conventional numeric (0-9) and related keys (#, *), and other keys used for operating the user computing entity 30 and may include a full set of alphabetic keys or set of keys that may be activated to provide a full set of alphanumeric keys. In addition to providing input, the user input interface can be used, for example, to activate or deactivate certain functions, such as screen savers and/or sleep modes. Through such inputs the user computing entity 30 can collect information/data, user interaction/input, and/or the like.

The user computing entity 30 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, RRAM, SONOS, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. The volatile and non-volatile storage or memory can store databases, database instances, database management system entities, data, applications, programs, program modules, scripts, source code, object code, byte code, compiled code, interpreted code, machine code, executable instructions, and/or the like to implement the functions of the user computing entity 30.

c. Exemplary Networks

In one embodiment, the networks 135 may include, but are not limited to, any one or a combination of different types of suitable communications networks such as, for example, cable networks, public networks (e.g., the Internet), private networks (e.g., frame-relay networks), wireless networks, cellular networks, telephone networks (e.g., a public switched telephone network), or any other suitable private and/or public networks. Further, the networks 135 may have any suitable communication range associated therewith and may include, for example, global networks (e.g., the Internet), MANs, WANs, LANs, or PANs. In addition, the networks 135 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, satellite communication mediums, or any combination thereof, as well as a variety of network devices and computing platforms provided by network providers or other entities.

V. Exemplary System Operations

Reference will now be made to FIGS. 4, 5, 6, and 7, which provide flowcharts and diagrams illustrating example steps, processes, procedures, and/or operations associated with a modular software application configuration management platform/system and/or one or more central computing entities in accordance with various embodiments of the present disclosure.

a. Exemplary Modular Software Application Configuration Management

Figure 4:
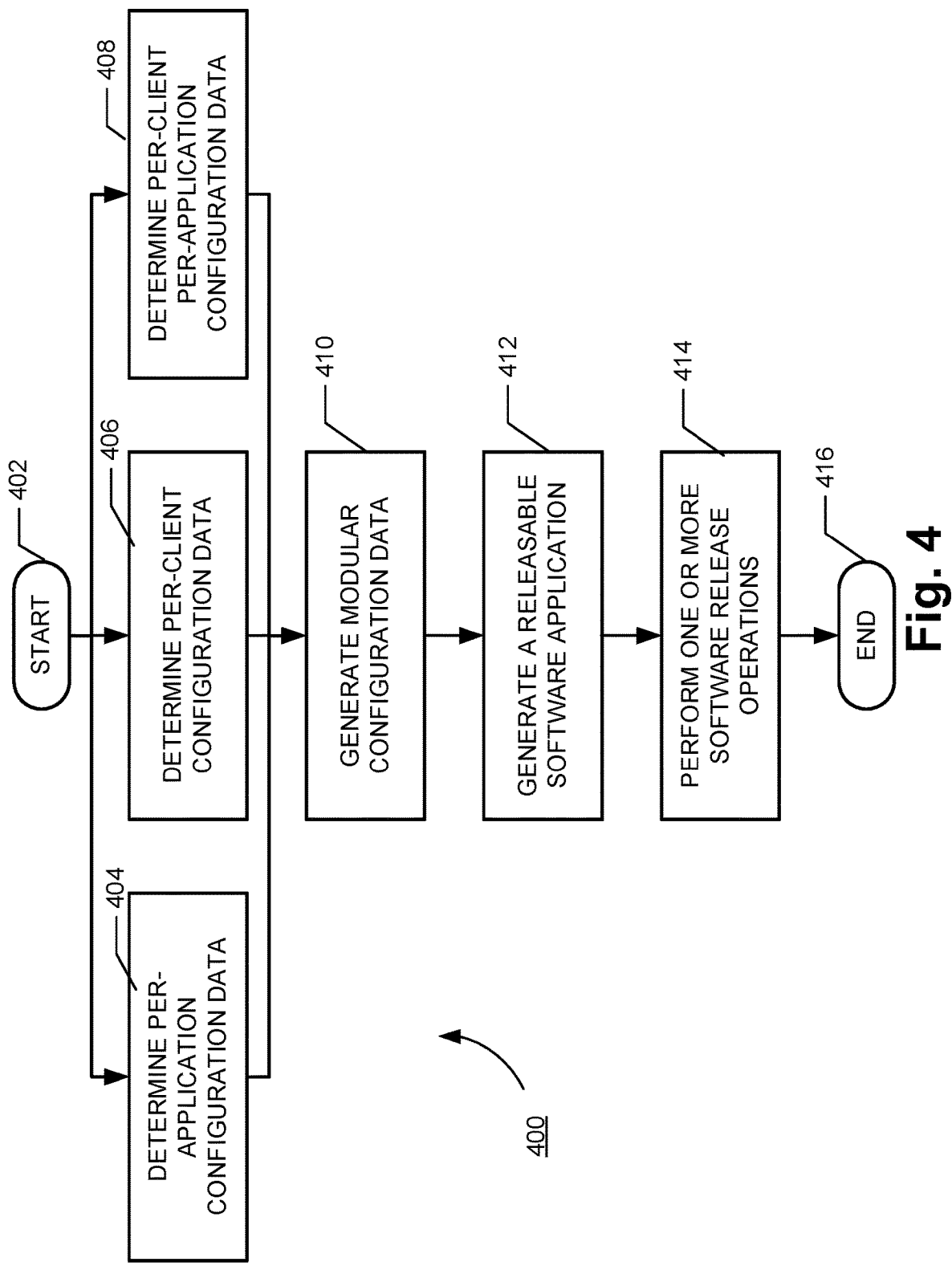
FIG. 4 is an example flowchart diagram of an example process for modular software application release to a cloud system in accordance with certain embodiments of the present invention.

Referring now to FIG. 4, an example flowchart diagram is illustrated. In particular, the example flowchart diagram illustrates an example process 400 for modular software application release to a cloud system (e.g., a cloud system including a cloud environment for a particular client entity).

Via the various steps/operations of the process 400, a processing circuitry (such as, but not limited to, the processing elements 205 of the central computing entity 65 described above in connection with at least FIG. 1 and FIG. 2A) may utilize modular configuration data to efficiently and reliably make post-development modifications to a developed software application (e.g., a developed operating system image) prior to the release/deployment of the noted software application on a client system that has provided the client configuration module data.

While various embodiments of the present invention describe modular software application configuration management with respect to a framework for releasing software application, it is noted that the scope of the present disclosure is not limited to these embodiments. In some embodiments, modular software application configuration management can have other use cases in addition to facilitating software application release, such as, but not limited to, facilitating software application development and/or software application maintenance.

Referring back to FIG. 4, the example process 400 begins at step/operation 402. Subsequent to step/operation 402, the example process 400 proceeds to step/operation 404. At step/operation 404, a processing circuitry (such as, but not limited to, the processing elements 205 of the central computing entity 65 described above in connection with at least FIG. 1 and FIG. 2A) determines per-application configuration data associated with a software application.

In some embodiments, the per-application configuration data for the software application is a data object that describes: (i) one or more post-development modifications that should be made to a corresponding software application prior to release/deployment of the software application on any client system, and/or (ii) one or more post-development testing procedures that need to be performed on the corresponding software application prior to release/deployment of the software application on any client system.

For example, the client configuration module data for a corresponding software application may require that, prior to the release/deployment of the software application on any client system, the antivirus component of the software application should be replaced with an antivirus component having a particular version. As another example, the client configuration module data for a corresponding software application may require that, prior to the release/deployment of the software application on any client system, a particular security scan test should be performed on the software application.

In some embodiments, the per-application configuration data for the software application include one or more per-application configuration modules for the software application. In the present disclosure, a per-application configuration module is a data object that includes one or more post-development modifications that should be made to a corresponding software application prior to release/deployment of the software application on any client system along with one or more post-development testing procedures that correspond to the one or more post-development modifications.

For example, the per-application configuration data may comprise at least one per-application configuration module that is configured to perform at least one post-development modification operation specific to the software application. Additionally, or alternatively, the per-application configuration data may comprise at least one per-application configuration module that is configured to perform at least one post-development testing operation specific to the software application.

In some embodiments, the per-application configuration module may be developed through supplying configuration files having particular configuration roles to a software provisioning, configuration management, and application-deployment tool, such as through files supplied to Ansible® which are marked as associated with particular Ansible roles. In some embodiments, the per-application configuration modules may additionally or alternatively be defined as modules for a modular pipeline library such as Jenkins®.

Referring back to FIG. 4, subsequent to step/operation 402, the example process 400 proceeds to step/operation 406. At step/operation 406, a processing circuitry (such as, but not limited to, the processing elements 205 of the central computing entity 65 described above in connection with at least FIG. 1 and FIG. 2A) determines per-client configuration data associated with a client system.

In some embodiments, the per-client configuration data for the software application is a data object that describes: (i) one or more post-development modifications that should be made to any software application prior to release/deployment of the software application on a corresponding client system, and/or (ii) one or more post-development testing procedures that need to be performed on any software application prior to release/deployment of the software application on the corresponding client system.

For example, the client configuration module data for a corresponding client system may require that, prior to the release/deployment of any software application on the client system, the antivirus component of the software application should be replaced with an antivirus component having a particular version. As another example, the client configuration module data for a corresponding client system may require that, prior to the release/deployment of any software application on the client system, a particular security scan test should be performed on the software application.

In some embodiments, the per-client configuration data for the software application include one or more per-client configuration modules for the software application. A per-client configuration module may be a data object that includes one or more post-development modifications that should be made to any software application prior to release/deployment of the software application on the corresponding client system along with one or more post-development testing procedures that correspond to the one or more post-development modifications.

For example, the per-client configuration data comprises at least one per-client configuration module that is configured to perform at least one post-development modification operation specific to the client system. Additionally, or alternatively, the per-client configuration data comprises at least one per-client configuration module that is configured to perform at least one post-development testing operation specific to the client system.

In some embodiments, the per-client configuration modules may be developed through supplying configuration files having particular configuration roles to a software provisioning, configuration management, and application-deployment tool, such as through files supplied to Ansible® which are marked as associated with particular Ansible roles. In some embodiments, the per-client configuration modules may additionally or alternatively be defined as modules for a modular pipeline library such as Jenkins®.

Referring back to FIG. 4, subsequent to step/operation 402, the example process 400 proceeds to step/operation 408. At step/operation 408, a processing circuitry (such as, but not limited to, the processing elements 205 of the central computing entity 65 described above in connection with at least FIG. 1 and FIG. 2A) determines per-application per-client configuration data associated with the software application and the client system.

In some embodiments, the per-client per-application configuration data for the software application and the client system is a data object that describes: (i) one or more post-development modifications that should be made to the software application prior to release/deployment of the software application on the corresponding client system, and/or (ii) one or more post-development testing procedures that need to be performed on the software application prior to release/deployment of the software application on the corresponding client system.

For example, the client configuration module data for a corresponding software application and a corresponding client system may require that, prior to the release/deployment of the software application on the client system, the antivirus component of the software application should be replaced with an antivirus component having a particular version. As another example, the client configuration module data for a corresponding software application and a corresponding client system may require that, prior to the release/deployment of any software application on the client system, a particular security scan test should be performed on the software application.

In some embodiments, the per-client per-application configuration data for the software application include one or more per-client per-application configuration modules for the software application. In some embodiments, a per-client per-application configuration module may be a data object that includes one or more post-development modifications that are configured to be made to the corresponding software application prior to release/deployment of the software application on the corresponding client system along with one or more post-development testing procedures that correspond to the one or more post-development modifications.

For example, the per-application per-client configuration data comprises at least one per-application per-client configuration module that is configured to perform at least one post-development modification operation specific to both the software application and the client system. Additionally, or alternatively, the per-application per-client configuration data comprises at least one per-application per-client configuration module that is configured to perform at least one post-development testing operation specific to both the software application and the client system.

In some embodiments, the per-client per-application configuration modules may be developed through supplying configuration files having particular configuration roles to a software provisioning, configuration management, and application-deployment tool, such as through files supplied to Ansible® which are marked as associated with particular Ansible roles. Additionally, or alternatively, the per-client per-application configuration modules may additionally or alternatively be defined as modules for a modular pipeline library such as Jenkins®.

Referring back to FIG. 4, subsequent to step/operation 404, step/operation 406, and/or step/operation 408, the example process 400 proceeds to step/operation 410. At step/operation 410, a processing circuitry (such as, but not limited to, the processing elements 205 of the central computing entity 65 described above in connection with at least FIG. 1 and FIG. 2A) generates modular configuration data based at least in part on at least one of the per-application configuration data, the per-client configuration data, and/or the per-application per-client configuration data In some embodiments, a processing circuitry (such as, but not limited to, the processing elements 205 of the central computing entity 65 described above in connection with at least FIG. 1 and FIG. 2A) combines the per-application configuration data, the per-client configuration data, and the per-client per-application configuration data to generate the modular configuration data. For example, the processing circuitry may combine the per-application configuration modules defined by the per-application configuration data, the per-client configuration modules defined by the per-client configuration data, and the per-client per-application configuration modules defined by the per-client per-application configuration data in order to generate the modular configuration data.

In some embodiments, a processing circuitry (such as, but not limited to, the processing elements 205 of the central computing entity 65 described above in connection with at least FIG. 1 and FIG. 2A) combines one or more of the per-application configuration data, the per-client configuration data, and/or the per-client per-application configuration data to generate the modular configuration data. For example, the processing circuitry may combine the per-application configuration modules defined by the per-application configuration data and the per-client configuration modules defined by the per-client configuration data in order to generate the modular configuration data. As another example, the processing circuitry may combine the per-client configuration modules defined by the per-client configuration data and the per-client per-application configuration modules defined by the per-client per-application configuration data in order to generate the modular configuration data. As another example, the processing circuitry may combine the per-application configuration modules defined by the per-application configuration data and the per-client per-application configuration modules defined by the per-client per-application configuration data in order to generate the modular configuration data.

Referring back to FIG. 4, subsequent to step/operation 410, the example process 400 proceeds to step/operation 412. At step/operation 412, a processing circuitry (such as, but not limited to, the processing elements 205 of the central computing entity 65 described above in connection with at least FIG. 1 and FIG. 2A) generates a releasable software application (for example, a validated base image as defined above) based at least in part on the modular configuration data.

As described above, the modular configuration data generated at step/operation 410 may define one or more required modifications of the software application prior to release/deployment of the software application on the client system. Additionally, or alternatively, the modular configuration data generated at step/operation 410 may define one or more required testing operations for the software application prior to release/deployment of the software application on the client system.

In some embodiments, the processing circuitry may carry out the one or more required modifications of the software application and/or the one or more required testing operations on the software application (for example but not limited to, a base image or a customized base image as defined above) to generate a releasable software application that is configured to be released/deployed to one or more client systems (for example but not limited to, a customized base image or a validated base image as defined above).

In some embodiments, a processing circuitry (such as, but not limited to, the processing elements 205 of the central computing entity 65 described above in connection with at least FIG. 1 and FIG. 2A) generates a releasable software application based at least in part on the modular configuration data by performing the modifications and/or tests required by the modular configuration data and releases the releasable software application to the client system. Details associated with releasing the releasable software application are described herein.

In some embodiments, a processing circuitry (such as, but not limited to, the processing elements 205 of the central computing entity 65 described above in connection with at least FIG. 1 and FIG. 2A) generates a releasable software application based at least in part on the modular configuration data by performing the modifications and/or tests required by the modular configuration data and causes another computing entity to release the releasable software application to the client system. Details associated with releasing the releasable software application are described herein.

In some embodiments, a processing circuitry (such as, but not limited to, the processing elements 205 of the central computing entity 65 described above in connection with at least FIG. 1 and FIG. 2A) generates a releasable software application based at least in part on the modular configuration data by performing the modifications and/or tests required by the modular configuration data in accordance with the sequential timeline or operational sequence required by the modular configuration data and transmits the releasable software application to the client system. Details associated with the sequential timeline or operational sequence and releasing the releasable software application are described herein.

In some embodiments, a processing circuitry (such as, but not limited to, the processing elements 205 of the central computing entity 65 described above in connection with at least FIG. 1 and FIG. 2A) generates a releasable software application based at least in part on the modular configuration data by performing the modifications and/or tests required by the modular configuration data in accordance with the sequential timeline or operational sequence required by the modular configuration data and causes another computing entity to release the releasable software application to the client system. Details associated with the sequential timeline or operational sequence and releasing the releasable software application are described herein.

Referring back to FIG. 4, subsequent to step/operation 412, the example process 400 proceeds to step/operation 414. At step/operation 414, a processing circuitry (such as, but not limited to, the processing elements 205 of the central computing entity 65 described above in connection with at least FIG. 1 and FIG. 2A) performs one or more software release operations by transmitting the releasable software application to the client system.

As described above, the processing circuitry may perform one or more software release operations by directly causes the release/deployment of the releasable software application on the client system through one or more networks. For example, the central computing entity 65 performs one or more software release operations by transmitting the releasable software application to one or more client systems through the one or more networks 135 described above.

In some embodiments, the processing circuitry (such as, but not limited to, the processing elements 205 of the central computing entity 65 described above in connection with at least FIG. 1 and FIG. 2A) preform the one or more software release operations by causing another computing entity to transmit the releasable software application to the client system. For example, the processing circuitry may provide the releasable software application to one or more cloud computing services that comprises one or more remote servers (for example, the Amazon Web Services (AWS), Microsoft® Azure, etc.), and the one or more cloud computing services may transmit the releasable software application to one or more client systems (for example, the one or more remote servers may transmit the releasable software application to the one or more client systems). In some embodiments, the processing circuitry may provide the releasable software application as an entry in a Wiki server and/or a cloud management server (e.g., a CloudBolt) associated with the client system.

In some embodiments, the processing circuitry (such as, but not limited to, the processing elements 205 of the central computing entity 65 described above in connection with at least FIG. 1 and FIG. 2A) further causes installation of the releasable software application on one or more computing devices associated with the client system.

Referring back to FIG. 4, subsequent to step/operation 414, the example process 400 proceeds to step/operation 416 and ends.

b. Exemplary Per-Application Configuration Data Determination

Figure 5:
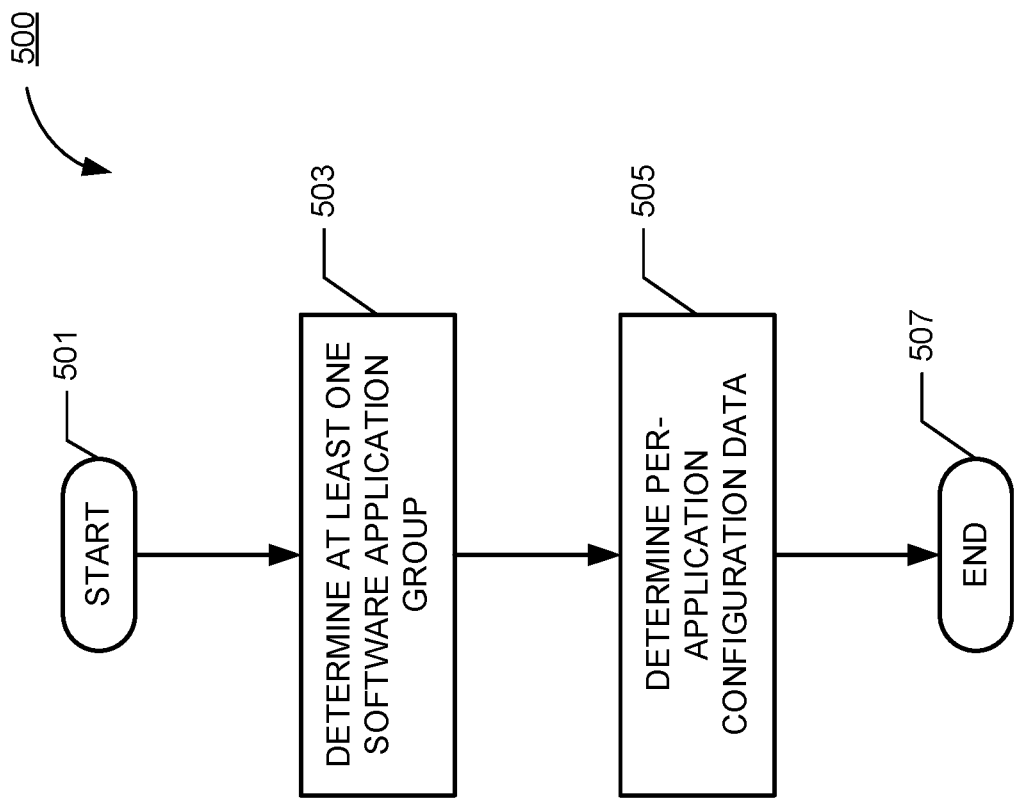
FIG. 5 is an example flowchart diagram of an example process for determining per-application configuration data in accordance with certain embodiments of the present invention.

Referring now to FIG. 5, an example flowchart diagram is illustrated. In particular, the example flowchart diagram illustrates an example process 500 for determining per-application configuration data.

Via the various steps/operations of the process 500, a processing circuitry (such as, but not limited to, the processing elements 205 of the central computing entity 65 described above in connection with at least FIG. 1 and FIG. 2A) may determine per-application configuration data associated with a software application based at least in part on a software group associated with the software application. As described above, the per-application configuration data may comprise at least one per-application configuration module that is configured to perform at least one post-development modification operation specific to the software application, and/or at least one per-application configuration module that is configured to perform at least one post-development testing operation specific to the software application. As used herein, the term "module" may describe a self-contained collection of data and instructions for a set of configuration operations associated with the module.

Referring back to FIG. 5, the example process 500 begins at step/operation 501. Subsequent to step/operation 501, the example process 500 proceeds to step/operation 503. At step/operation 503, a processing circuitry (such as, but not limited to, the processing elements 205 of the central computing entity 65 described above in connection with at least FIG. 1 and FIG. 2A) determines at least one software application group associated with the software application.

In the present disclosure, the term "software application group" may refer to a categorization or grouping associated with each of a plurality of software applications based at least in part on one or more parameters or characteristics of the plurality of software applications.

For example, the software application group may be defined based at least in part on the particular software application release platform to be used to release the software application. For example, a first set of software applications may be released through the Amazon Web Services (AWS), a second set of software applications may be released through Microsoft® Azure, etc. In this example, the processing circuitry may determine that each software application in the first set of software applications is associated with a first software application group, and that each software application in the second set of software applications is associated with a second software application group (which is different from the first software application group).

Additionally, or alternatively, the processing circuitry may determine the software application group of the software application based at least in part on one or more other information related to the software applications. For example, the processing circuitry may determine a grouping of software applications based at least in part on a type, a version, a release date, and/or a vendor of the software application. Additionally, or alternatively, the processing circuitry may determine the software application group of the software application based at least in part on other information.

Referring back to FIG. 5, subsequent to step/operation 503, the example process 500 proceeds to step/operation 505. At step/operation 505, a processing circuitry (such as, but not limited to, the processing elements 205 of the central computing entity 65 described above in connection with at least FIG. 1 and FIG. 2A) determines determine the per-application configuration data based at least in part on the at least one software application group.

In some embodiments, the processing circuitry may retrieve at least one configuration module indicating at least one post-development modification operation specific to software applications in the at least one software application group, and/or at least one per-application configuration module indicating at least one post-development testing operation specific to the software applications in the at least one software application group. The processing circuitry may generate the per-application configuration data based at least in part on the retrieved at least one configuration module associated with the software application group.

For example, the per-application configuration data for a particular software application may be determined based at least in part on application configuration data for a group of software applications including the particular software application (such as a group of all software applications that can be released via a particular software application release platform as described above).

Additionally, or alternatively, the per-application configuration data for the particular software application may alternatively be determined based at least in part on application configuration data for the particular software application given a type, a version, and/or a release date of the software application. For example, the central computing entity 65 may maintain specific per-application configuration data for all Windows operating system releases, for all Windows 10 releases, for all Windows 10 releases post a certain update, and/or the like.

Referring back to FIG. 5, subsequent to step/operation 505, the example process 500 proceeds to step/operation 507 and ends.

c. Exemplary Per-Client Configuration Data Generation

Figure 6:
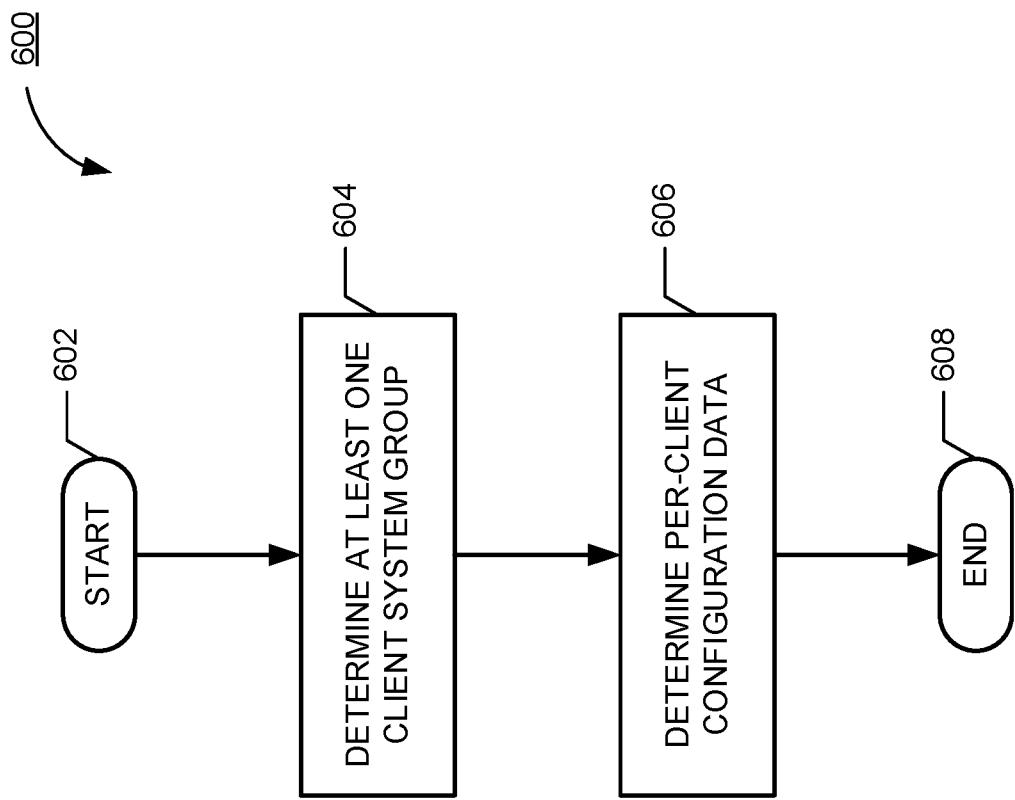
FIG. 6 is a flowchart diagram of an example process for determining per-client configuration data in accordance with certain embodiments of the present invention.

Referring now to FIG. 6, an example flowchart diagram is illustrated. In particular, the example flowchart diagram illustrates an example process 600 for determining per-client configuration data.

Via the various steps/operations of the process 600, a processing circuitry (such as, but not limited to, the processing elements 205 of the central computing entity 65 described above in connection with at least FIG. 1 and FIG. 2A) may determine per-client configuration data associated with a client system based at least in part on a client group associated with the client system. As described above, the per-client configuration data may comprise at least one per-client configuration module indicating at least one post-development modification operation specific to the client system, and/or at least one per-client configuration module indicating at least one post-development testing operation specific to the client system. As used herein, the term "module" may describe a self-contained collection of data and instructions for a set of configuration operations associated with the module.

Referring back to FIG. 6, the example process 600 begins at step/operation 602. Subsequent to step/operation 602, the example process 600 proceeds to step/operation 604. At step/operation 604, a processing circuitry (such as, but not limited to, the processing elements 205 of the central computing entity 65 described above in connection with at least FIG. 1 and FIG. 2A) determines at least one client system group associated with the client system.

In the present disclosure, the term "client system group" may refer to a categorization or grouping associated with each of a plurality of client systems based at least in part on one or more parameters or characteristics of the plurality of client systems.

For example, the client system group may be defined based at least in part on an operating system associated with the client system. For example, a first set of client systems may be associated with Linux operating system, a second set of client systems may be associated with Microsoft® Windows® operating system, etc. In this example, the processing circuitry may determine that each client system in the first set of client systems is associated with a first client system group, and that each client system in the second set of client systems is associated with a second client system group (which is different from the first client system group).

Referring back to FIG. 6, subsequent to step/operation 604, the example process 600 proceeds to step/operation 606. At step/operation 606, a processing circuitry (such as, but not limited to, the processing elements 205 of the central computing entity 65 described above in connection with at least FIG. 1 and FIG. 2A) determines determine the per-client configuration data based at least in part on the at least one client system group.

In some embodiments, the processing circuitry may retrieve at least one configuration module indicating at least one post-development modification operation specific to client systems in the at least one client system group, and/or at least one per-client configuration module indicating at least one post-development testing operation specific to the client systems in the at least one client system group. The processing circuitry may generate the per-client configuration data based at least in part on the retrieved at least one configuration module associated with the client system group.

For example, the per-client configuration data for a particular client system may be determined based at least in part on application configuration data for a group of client systems including the particular client system (such as a group of client systems that are all associated with Microsoft® Windows® operating system).

Referring back to FIG. 6, subsequent to step/operation 606, the example process 600 proceeds to step/operation 608 and ends.

d. Exemplary Operational Sequence Determination

Figure 7:
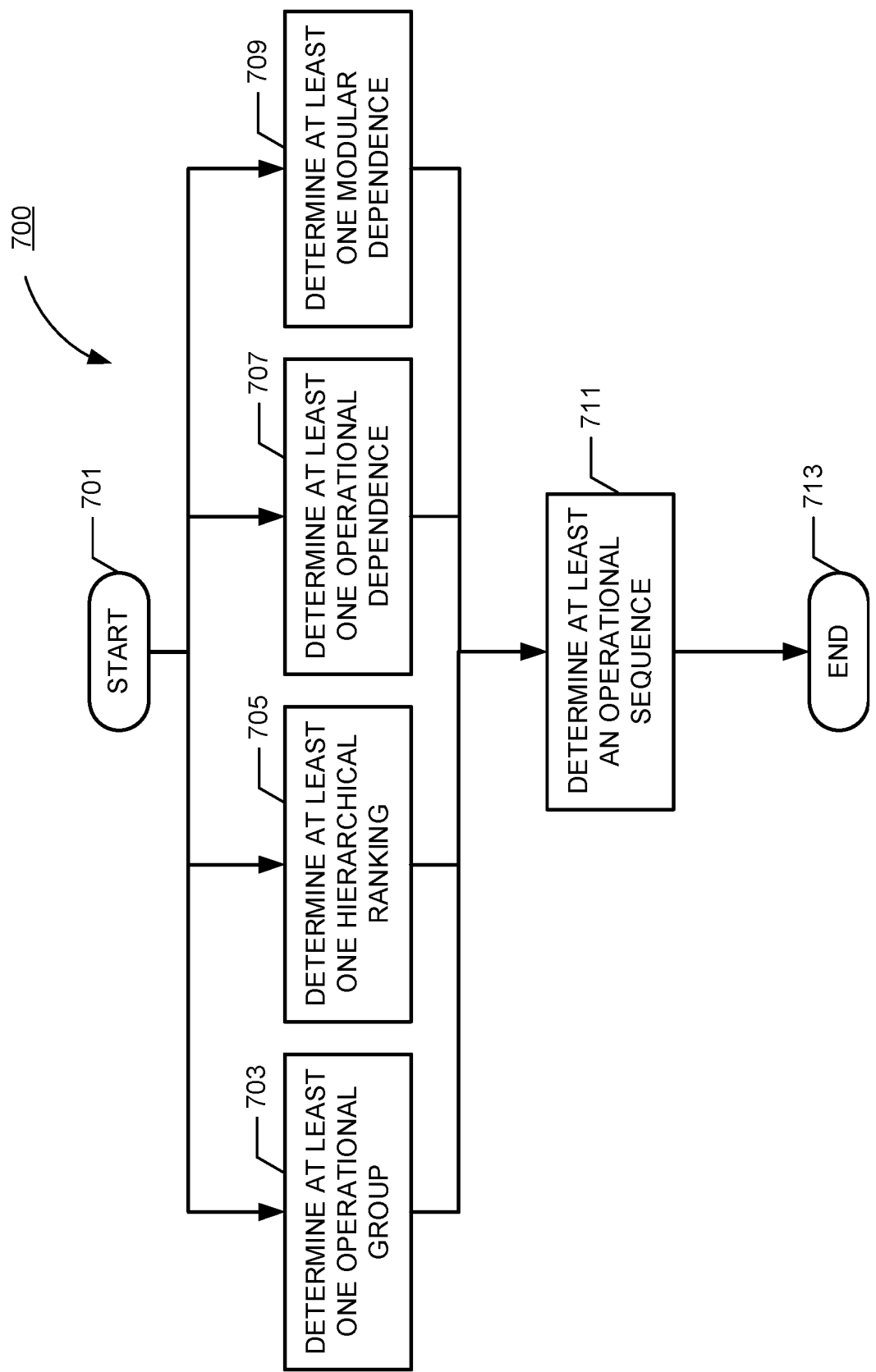
FIG. 7 is a flowchart diagram of an example process for determining operational sequence in accordance with certain embodiments of the present invention.

Referring now to FIG. 7, an example flowchart diagram is illustrated. In particular, the example flowchart diagram illustrates an example process 700 for determining operational sequence of modification operations and/or testing operations as defined by the modular configuration data.

Via the various steps/operations of the process 700, a processing circuitry (such as, but not limited to, the processing elements 205 of the central computing entity 65 described above in connection with at least FIG. 1 and FIG. 2A) may determine operational sequence of modification operations and/or testing operations based at least in part on one or more of at least one operational groupings, at least one hierarchical ranking, at least one operational dependence, and/or at least one modular dependence.

Referring back to FIG. 7, the example process 700 begins at step/operation 701. As described above, the modular configuration data may define one or more required modifications of the software application prior to release/deployment of the software application on the client system. Additionally, or alternatively, the modular configuration data may define one or more required testing operations for the software application prior to release/deployment of the software application on the client system. The modular configuration data may further define a sequential timeline or operational sequence for performing action items (e.g., modifications and tests) described by the modular configuration data. In the example process 700 illustrated in FIG. 7, the sequential timeline or operational sequence may be determined based at least in part on at least one of the following: (i) operational groups of modifications and tests in the modular configuration data (in connection with step/operation 703), (ii) hierarchical rankings of configuration modules (in connection with step/operation 705), (iii) subject matter domain data describing functional dependence of configuration modules (in connection with step/operation 707), and/or (iv) subject matter domain data describing functional dependence of processes affected by various modifications and/or tests (in connection with step/operation 709).

Referring back to FIG. 7, subsequent to step/operation 701, the example process 700 proceeds to step/operation 703. At step/operation 703, a processing circuitry (such as, but not limited to, the processing elements 205 of the central computing entity 65 described above in connection with at least FIG. 1 and FIG. 2A) determines at least one operational group. In some embodiments, the processing circuitry determines at least an operational sequence at step/operation 711 based at least in part on the at least one operational group that is determined at step/operation 703.

In some embodiments, an operational group of associated with at least one post-development modification operation or at least one post-development testing operation may refer to a categorization or grouping of modifications and tests described by the modular configuration data based at least in part on one or more parameters and/or functionalities associated the modifications and tests. For example, modifications and tests associated with per-application configuration modules may belong to a first operational group, modifications and tests associated with per-client configuration modules may belong to a second operational group, and modifications and tests associated with per-application per-client configuration modules may belong to a third operational group.

As an example, if the modular configuration data for a software application and a client system includes a per-application configuration module A requiring modification MA followed by the test TA, a per-client configuration module B requiring modification MB followed by the test TB, and a per-client per-application configuration module C requiring modification MC followed by the test TC, the sequential timeline or operational sequence described by the modular configuration data may require the following order of action items:

MC→TC→MB→TB→MA→TA.

While the noted example implies a hierarchical ranking of configuration modules according to which per-application per-client configuration modules are hierarchically superior to per-client configuration modules and the latter are hierarchically superior to per-application configuration modules, a person of ordinary skill in the relevant technology will recognize that other hierarchical rankings of configuration modules may be feasible and/or desirable.

In some embodiments, subsequent to step/operation 701, the example process 700 proceeds to step/operation 705. At step/operation 705, a processing circuitry (such as, but not limited to, the processing elements 205 of the central computing entity 65 described above in connection with at least FIG. 1 and FIG. 2A) determines at least one hierarchical ranking. In some embodiments, the processing circuitry determines at least an operational sequence at step/operation 711 based at least in part on the at least one hierarchical ranking that is determined at step/operation 705.

In some embodiments, the hierarchical ranking is associated with one or more of per-application configuration module, per-client configuration module, and/or per-application per-client configuration module, and may define an order or rank of the per-application configuration module, the per-client configuration module, and/or per-application per-client configuration module In some embodiments, the hierarchical ranking may be determined based at least in part on subject matter domain data associated the configuration module (for example, the subject matter associated with the software application). As an example, if the modular configuration data for a software application and a client system includes a per-application configuration module A requiring modification MA followed by the test TA, a per-client configuration module B requiring modification MB followed by the test TB, and a per-client per-application configuration module C requiring modification MC followed by the test TC, and given that the subject matter domain data describes the following hierarchical ranking: per-application per-client configuration modules are hierarchically superior to the per-client configuration modules and the latter are hierarchically superior to per-application configuration modules, the sequential timeline or operational sequence described by the modular configuration data may require the following order of action items:

MC→TC→MB→TB→MA→TA.

In some embodiments, subsequent to step/operation 701, the example process 700 proceeds to step/operation 707. At step/operation 707, a processing circuitry (such as, but not limited to, the processing elements 205 of the central computing entity 65 described above in connection with at least FIG. 1 and FIG. 2A) determines at least one operational dependence. In some embodiments, the processing circuitry determines at least an operational sequence at step/operation 711 based at least in part on the at least one functionality dependence that is determined at step/operation 707.

In some embodiments, the at least one functionality dependence is associated at least one post-development modification operation or at least one post-development testing operation. For example, the at least one functionality dependence may indicate that the functionality of one module depends on the functionality of another module. In some embodiments, the at least one modular dependence may be determined based at least in part on the subject matter domain data.

For example, if the modular configuration data for a software application and a client system includes a configuration module A requiring modification MA followed by the test TA, a configuration module B requiring modification MB followed by the test TB, and a configuration module C requiring modification MC followed by the test TC, and given that subject matter domain data describes the following functionality dependence: the functionality affected by the configuration module A depends on the functionality affected by the configuration module C, and the functionality affected by the configuration module C depends on the functionality affected by the configuration module B, the sequential timeline or operational sequence described by the modular configuration data may require the following order of action items:

MC→TC→MB→TB→MA→TA.

In some embodiments, subsequent to step/operation 701, the example process 700 proceeds to step/operation 709. At step/operation 709, a processing circuitry (such as, but not limited to, the processing elements 205 of the central computing entity 65 described above in connection with at least FIG. 1 and FIG. 2A) determines at least one modular dependence. In some embodiments, the processing circuitry determines at least an operational sequence at step/operation 711 based at least in part on the at least one modular dependence that is determined at step/operation 709.

In some embodiments, the at least one modular dependence is associated with one or more of a per-application configuration module, a per-client configuration module, or a per-application per-client configuration module. For example, the at least one modular dependence may indicate that one module depends on one or more other modules. In some embodiments, the at least one modular dependence may be determined based at least in part on the subject matter domain data.

For example, if the modular configuration data for a software application and a client system includes a configuration module A requiring modification MA followed by the test TA, a configuration module B requiring modification MB followed by the test TB, and a module C requiring modification MC followed by the test TC, and given that subject matter domain data describes the following modular dependence: configuration module A is hierarchically superior to the configuration module B and the latter is hierarchically superior to configuration module C, the sequential timeline or operational sequence described by the modular configuration data may require the following order of action items:

MC→TC→MB→TB→MA→TA.

Referring back to FIG. 7, subsequent to step/operation 703, step/operation 705, step/operation 707, and/or step/operation 709, the example process 700 proceeds to step/operation 711. At step/operation 711, a processing circuitry (such as, but not limited to, the processing elements 205 of the central computing entity 65 described above in connection with at least FIG. 1 and FIG. 2A) determines at least an operational sequence.

In some embodiments, the processing circuitry may determine the operational sequence based at least in part on one or more of the at least one operational group as described above in connection with step/operation 703, at least one hierarchical ranking as described above in connection with step/operation 705, at least one operational dependence as described above in connection with step/operation 707, and/or at least one modular dependence as described above in connection with step/operation 709.

As an example, the processing circuitry may first determine an initial operational sequence based at least in part on the at least one operational group or the at least one hierarchical ranking, and then adjust the initial operational sequence based at least in part on the at least one operational dependence or the at least one modular dependence. Additionally, or alternatively, the processing circuitry may determine the operational sequence based at least in part on other combinations of step/operation 703, step/operation 705, step/operation 707, and step/operation 709.

Referring back to FIG. 7, subsequent to step/operation 711, the example process 700 proceeds to step/operation 713 and ends.

In some embodiments, the processing circuitry (such as, but not limited to, the processing elements 205 of the central computing entity 65 described above in connection with at least FIG. 1 and FIG. 2A) is configured to: retrieve a base image associated with at least one software application; generate a customized base image based at least in part on conducting at least one operational verification operation on the base image; generate a validated base image based at least in part on conducting at least one operational testing operation on the customized base image; generate a release note data object associated with the validated base image; and perform one or more image release operations by releasing the validated base image and the release note data object to at least one client system.

In some embodiments, the processing circuitry (such as, but not limited to, the processing elements 205 of the central computing entity 65 described above in connection with at least FIG. 1 and FIG. 2A) is further configured to: retrieve software development data associated with a software application; receive modular configuration data from a client system; determine application usage data based at least in part on a user profile of the client system that is associated with the software application; generate a release note data object based at least in part on at least one of the software development data, the modular configuration data, and the application usage data; and perform one or more software application release operations by transmitting the release note data object to the client system.

VI. CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. An apparatus comprising at least one processor and at least one non-transitory memory comprising a computer program code, the at least one non-transitory memory and the computer program code configured to, with the at least one processor, cause the apparatus to:
generate modular configuration data based at least in part on per-application configuration data associated with a software application, per-client configuration data associated with a client system, and per-application per-client configuration data associated with the software application and the client system, wherein the modular configuration data comprises one or more of: (i) first modular configuration data describing one or more required post-development modification operations for all software applications associated with a software application group of the software application, (ii) second modular configuration data describing one or more required post-development testing operations for all software applications associated with the software application group of the software application, (iii) third modular configuration data describing one or more required post-development modification operations for all client systems associated with a client system group of the client system, or (iv) fourth modular configuration data describing one or more required post-development testing operations for all client systems associated with the client system group of the client system;
generate a releasable software application based at least in part on the modular configuration data; and
initiate the performance of one or more software release operations by transmitting the releasable software application to the client system.

2. The apparatus of claim 1, wherein the at least one non-transitory memory and the computer program code are further configured to, with the at least one processor, cause the apparatus to:
determine the per-application configuration data associated with the software application;
determine the per-client configuration data associated with the client system; and
determine the per-application per-client configuration data associated with the software application and the client system.

3. The apparatus of claim 2, wherein, when determining the per-application configuration data, the at least one non-transitory memory and the computer program code are configured to, with the at least one processor, cause the apparatus to:
determine at least one software application group associated with the software application; and
determine the per-application configuration data based at least in part on the at least one software application group.

4. The apparatus of claim 2, wherein, when determining the per-client configuration data, the at least one non-transitory memory and the computer program code are configured to, with the at least one processor, cause the apparatus to:
  determine at least one client system group associated with the client system; and
  determine the per-client configuration data based at least in part on the at least one client system group.

5. The apparatus of claim 1, wherein the per-application configuration data comprises at least one per-application configuration module indicating at least one post-development modification operation specific to the software application.

6. The apparatus of claim 1, wherein the per-application configuration data comprises at least one per-application configuration module indicating at least one post-development testing operation specific to the software application.

7. The apparatus of claim 1, wherein the per-client configuration data comprises at least one per-client configuration module indicating at least one post-development modification operation specific to the client system.

8. The apparatus of claim 1, wherein the per-client configuration data comprises at least one per-client configuration module indicating at least one post-development testing operation specific to the client system.

9. The apparatus of claim 1, wherein the per-application per-client configuration data comprises at least one per-application per-client configuration module indicating at least one post-development modification operation specific to both the software application and the client system.

10. The apparatus of claim 1, wherein the per-application per-client configuration data comprises at least one per-application per-client configuration module indicating at least one post-development testing operation specific to both the software application and the client system.

11. The apparatus of claim 1, wherein the modular configuration data defines at least an operational sequence based at least in part on at least one operational group associated with at least one post-development modification operation or at least one post-development testing operation.

12. The apparatus of claim 1, wherein the modular configuration data defines at least an operational sequence based at least in part on at least one hierarchical ranking associated with one or more of per-application configuration module, per-client configuration module, or per-application per-client configuration module.

13. A computer-implemented method comprising:
  generating modular configuration data based at least in part on per-application configuration data associated with a software application, per-client configuration data associated with a client system, and per-application per-client configuration data associated with the software application and the client system, wherein the modular configuration data comprises one or more of: (i) first modular configuration data describing one or more required post-development modification operations for all software applications associated with a software application group of the software application, (ii) second modular configuration data describing one or more required post-development testing operations for all software applications associated with the software application group of the software application, (iii) third modular configuration data describing one or more required post-development modification operations for all client systems associated with a client system group of the client system, or (iv) fourth modular configuration data describing one or more required post-development testing operations for all client systems associated with the client system group of the client system;
  generating a releasable software application based at least in part on the modular configuration data; and
  initiating the performance of one or more software release operations by transmitting the releasable software application to the client system.

14. The computer-implemented method of claim 13, further comprising:
  determining the per-application configuration data associated with the software application;
  determining the per-client configuration data associated with the client system; and
  determining the per-application per-client configuration data associated with the software application and the client system.

15. The computer-implemented method of claim 14, wherein determining the per-application configuration data further comprises:
  determining at least one software application group associated with the software application; and
  determining the per-application configuration data based at least in part on the at least one software application group.

16. The computer-implemented method of claim 14, wherein determining the per-client configuration data further comprises:
  determining at least one client system group associated with the client system; and
  determining the per-client configuration data based at least in part on the at least one client system group.

17. The computer-implemented method of claim 13, wherein the per-application configuration data comprises at least one per-application configuration module indicating at least one post-development modification operation specific to the software application.

18. The computer-implemented method of claim 13, wherein the per-application configuration data comprises at least one per-application configuration module indicating at least one post-development testing operation specific to the software application.

19. The computer-implemented method of claim 13, wherein the per-client configuration data comprises at least one per-client configuration module indicating at least one post-development modification operation specific to the client system.

20. A computer program product comprising at least one non-transitory computer-readable storage medium having computer-readable program code portions stored therein, the computer-readable program code portions comprising an executable portion configured to:
  generate modular configuration data based at least in part on per-application configuration data associated with a software application, per-client configuration data associated with a client system, and per-application per-client configuration data associated with the software application and the client system, wherein the modular configuration data comprises one or more of: (i) first modular configuration data describing one or more required post-development modification operations for all software applications associated with a software application group of the software application, (ii) second modular configuration data describing one or more required post-development testing operations for all software applications associated with the software application group of the software application, (iii) third modular configuration data describing one or more required post-development modification operations for all client systems associated with a client system group of the client system, or (iv) fourth modular configuration data describing one or more required post-development testing operations for all client systems associated with the client system group of the client system;

generate a releasable software application based at least in part on the modular configuration data; and initiate the performance of one or more software release operations by transmitting the releasable software application to the client system.

\* \* \* \* \*